United States Patent

Sarpola et al.

Patent Number: 5,970,415
Date of Patent: Oct. 19, 1999

[54] METHOD FOR HANDLING COLLISION OF CALLS

[75] Inventors: Jussi Sarpola; Vesa Heikkilä; Ari-Pekka Taskila; Heimo Pentikäinen; Olli Liinamaa; Pekka Rusi, all of Oulu, Finland

[73] Assignee: Nokia Telecommunications Oy, Espoo, Finland

[21] Appl. No.: 08/732,407

[22] PCT Filed: Apr. 26, 1995

[86] PCT No.: PCT/FI95/00229

§ 371 Date: Dec. 16, 1996

§ 102(e) Date: Dec. 16, 1996

[87] PCT Pub. No.: WO95/29563

PCT Pub. Date: Nov. 2, 1995

[30] Foreign Application Priority Data

Apr. 27, 1994 [FI] Finland ..................................... 941946

[51] Int. Cl.⁶ ....................................................... H04Q 7/24
[52] U.S. Cl. ........................... 455/464; 455/423; 379/350
[58] Field of Search ................................... 455/464, 74.1, 455/411, 423; 379/241, 201, 211, 229, 265, 350

[56] References Cited

U.S. PATENT DOCUMENTS

| 5,123,042 | 6/1992 | Saegusa et al. | 379/61 |
| 5,303,290 | 4/1994 | Redberg et al. | 379/241 |
| 5,381,415 | 1/1995 | Mizutani | 379/350 |
| 5,577,113 | 11/1996 | Bray et al. | 379/220 |

FOREIGN PATENT DOCUMENTS

| 136 167 | 4/1985 | European Pat. Off. . |
| 426 451 | 5/1991 | European Pat. Off. . |
| 64-19842 | 1/1989 | Japan . |

*Primary Examiner*—Dwayne D. Bost
*Assistant Examiner*—Myron K. Wyche
*Attorney, Agent, or Firm*—Pillsbury Madison & Sutro LLP

[57] ABSTRACT

A method and a subscriber unit and a subscriber network element, in a radio system provided with a wireless local loop, for handling a collision of an outgoing call from the subscriber unit and a terminating call at the subscriber unit. When the collision is detected, the switching of the outgoing call is interrupted, a release frame is transmitted to the subscriber unit, a busy tone is transmitted from the subscriber unit to a subscriber in response to the release frame, a calling is transmitted to the subscriber unit, and the terminating call is switched to the subscriber unit after responding to the calling.

11 Claims, 1 Drawing Sheet

METHOD FOR HANDLING COLLISION OF CALLS

This application is the national phase of international application PCT/FI95/00229 filed Apr. 26, 1995 which designated the U.S.

BACKGROUND OF THE INVENTION

The present invention relates to a method for handling a collision of an outgoing call from a subscriber unit and a call terminating at a subscriber unit in a radio system providing a wireless local loop. The invention also relates to a subscriber unit of a radio system providing a wireless local loop, the subscriber unit including a terminal equipment and a user interface, the terminal equipment comprising receiver means for receiving radio-frequency signals. The invention further relates to a subscriber network element of a radio system providing a wireless local loop, the subscriber network element having a data transfer connection with a local exchange of a public switched telephone network and comprising means for establishing, via base stations, a radio connection to subscriber units located in the coverage area of the radio system, and for transmitting telecommunication signals between the subscriber units and the local exchange.

The invention relates to a WLL system (Wireless Local Loop), that is, a radio system providing a wireless local loop, in which system subscriber units are connected by a radio connection via base stations and a WLL subscriber network element to a PSTN exchange (Public Switched Telephone Network). Any conventional type of user interface or telephone set can be connected to the WLL system by means of a special terminal equipment, the radio path being thus invisible to the user.

In this connection, a subscriber unit refers to the equipment the subscriber has for transmitting and receiving telecommunication signals, that is, in the case of the WLL subscriber unit, the subscriber unit comprises a terminal equipment consisting of a radio part and a teleadapter, and a user interface, such as a telephone, a telefax terminal, a computer/modem combination or the like, connected to the terminal equipment.

Description of the Related Art

As a call departs from a subscriber unit of a known WLL system, a calling is first transmitted from the subscriber unit to the subscriber network element. The subscriber network element immediately acknowledges said calling by sending a standby message to the subscriber unit, after which it sends a signal indicating the OFF-hook state to a local exchange of the public switched telephone network. After this, diallings are transmitted from the subscriber unit, for instance as digit frames of said WLL system, and said diallings are converted in the subscriber network element into dialling signals used in the public switched telephone network. Subsequently, the subscriber network transmits the dialling it received to the local exchange that handles the digit analysis and the switching of the call as if it were a question of a normal wired subscriber unit of the public switched telephone network.

In the above-described known WLL system, problems occur in a situation in which an outgoing and a terminating call collide. The collision of calls means that a call (an outgoing call) is being set up from a subscriber unit at the same time as a calling, that is, in practice a call (a terminating call), is transmitted by the local exchange to the subscriber unit. Such a situation can occur, for example, if a calling signal intended for a certain subscriber unit is transmitted from the local exchange to the subscriber network element at the same time as a call is being set up from the subscriber unit in question. If the subscriber network element regardless of the terminating call sends an OFF-hook message to the exchange in order to forward the outgoing call to the exchange, the exchange interprets the outgoing call as a response to the terminating call, whereby the outgoing and terminating calls are connected into one call at the exchange. The diallings transmitted from the WLL subscriber unit will then be heard in the handset of the receiving party and the user of the WLL subscriber unit will have no way of noticing, at least not at an early stage, that the call has been switched incorrectly.

The above-mentioned situation occurs at least in those WLL systems in which the subscriber network element is connected to a local exchange with an open multiplexer connection of CCITT Q.512 V2 type using a 2 Mbit/s PCM system.

SUMMARY OF THE INVENTION

The object of this invention is to solve the above-mentioned problem and to introduce an arrangement by means of which a collision between an outgoing and a terminating call can be managed so that the calls are not switched incorrectly. This object is achieved with the method of the invention that is characterized in that the switching of the outgoing call from the subscriber unit is interrupted, a release frame is transmitted to the subscriber unit, a calling is transmitted to the subscriber unit, and the terminating call is switched to the subscriber unit after it has responded to the calling.

The invention further relates to a subscriber unit by means of which the method of the invention can be applied. The subscriber unit of the invention is characterized in that the terminal equipment comprises a signal generator responsive to the receiver means and to the user interface for generating and feeding a predetermined voice-frequency signal to the user interface when the receiver means receive the release frame during the OFF-hook state of the user interface.

The invention also relates to a subscriber network element by means of which the method of the invention can be applied. The subscriber network element of the invention is characterized in that the subscriber network element comprises means for detecting a collision between an outgoing call from a given subscriber unit and a call terminating at the same subscriber unit; interruption means for interrupting the switching of the outgoing call and for sending a release frame to the subscriber unit when a collision is detected; and means responsive to the interruption means for sending a calling to the subscriber unit after transmitting the release frame.

The invention is based on the idea that when the switching of the outgoing call is interrupted and a call release frame is transmitted to the subscriber unit, which upon receiving the frame, immediately after detecting a collision between an outgoing and a terminating call, starts generating a busy tone to the user of the subscriber unit, the collision between the outgoing and terminating call can be managed without the collision causing any incorrect switchings or other disadvantages. Therefore, the most significant advantages of the invention are that no incorrect switchings are caused by the collision and that the user of the subscriber unit is informed in a simple and understandable way that the phone should be put down.

The preferred embodiments of the method, the subscriber unit and the subscriber network element of the invention are disclosed in the appended dependent claims 2, 4 and 6–7.

BRIEF DESCRIPTION OF THE DRAWING

In the following, the invention will be described in more detail by means of a first preferred embodiment with reference to the accompanying figures, of which

DETAILED DESCRIPTION OF THE PREFERRED EMBODIMENT

Figure 1:
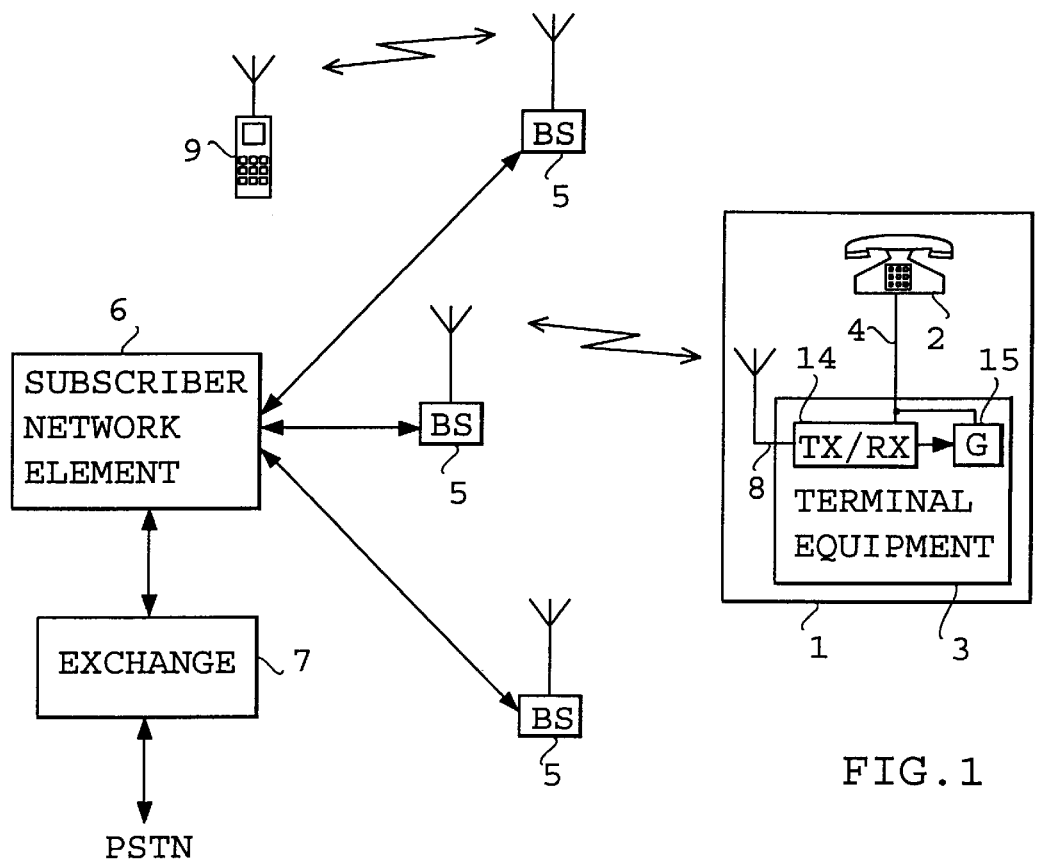
FIG. 1 shows a block diagram of a WLL system and FIG. 2 shows a block diagram of the subscriber network element shown in FIG. 1.

FIG. 1 is a block diagram of a part of a WLL system in which the method of the invention can be applied. The WLL system in FIG. 1 is based on an NMT450i system that has been simplified by removing unnecessary features. Base stations 5 correspond to parts of the NMT-450i (Nordisk Mobil Telefon) cellular radio system. As far as signalling is concerned, a subscriber unit 1 operates almost as a normal subscriber unit of the NMT-450i system. Through the base stations and a subscriber network element 6, calls can also be made with an ordinary mobile phone 9 of the NMT-450i system.

The subscriber unit 1 shown in FIG. 1 comprises a telephone 2 and a terminal equipment 3. In FIG. 1 the telephone 2 is an ordinary telephone which uses voice-frequency dialling and can be connected to a fixed telephone network. In FIG. 1 the telephone 2 and the terminal equipment 3 are connected by a two-wire lead 4. The terminal equipment 3 contains signal-processing means for adapting a speech path to a radio channel. Such signal-processing means are, for example, a radio part, including an antenna 8, a radio transceiver unit 14 and a teleadapter that adapts the radio part to an ordinary telephone 2. The terminal equipment also comprises a signal generator 15 by which it can generate different signalling tones, such as a busy tone, in use in a public switched telephone exchange.

The subscriber unit 1 is connected by means of radio-frequency signals via the antenna 8 to the base station 5 (the figure shows three base stations BS), through which calls are forwarded to the subscriber network element 6 and further to the PSTN network exchange (Public Switched Telephone Network), that is, to a fixed telephone network exchange 7. The subscriber network element 6 is connected to a local exchange of the fixed telephone network with an open multiplexer connection of CCITT Q.512 V2 type using the 2 Mbit/s PCM system.

Figure 2:
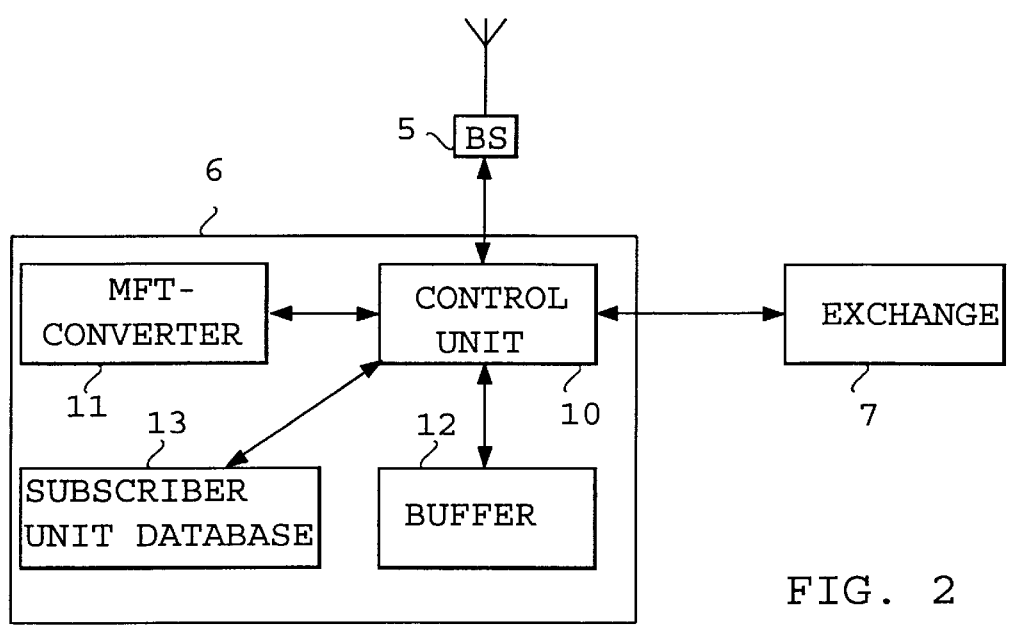

FIG. 2 shows a block diagram of the subscriber network element 6 shown in FIG. 1. In connection with setting up an outgoing call from the WLL subscriber unit, a calling transmitted from the WLL terminal equipment via a base station 5 is transmitted to a control unit 10 of the subscriber network element 6. The control unit 10 acknowledges the calling by sending the subscriber unit a message by which a traffic channel to be used is allocated to the subscriber unit. After this, the control unit 10 sends a standby message to the subscriber unit by which it notifies of its readiness to receive a dialling, and an OFF-hook message to the local exchange 7, and remains waiting for the local exchange 7 to switch on a ready-for-dialling tone for the subscriber network element.

Immediately after the user interface has moved to the OFF-hook state (the handset lifted), the signal generator 15 of the subscriber unit starts generating and feeding a ready-for-dialling tone to the user interface, whereby the user of the unit can start feeding the dialling with the user interface. The diallings selected by the subscriber are then buffered in the terminal equipment 2. When the transceiver unit of the subscriber unit has moved to the channel allocated by the subscriber network element 6 and has received the standby message, it starts transmitting diallings selected by the subscriber to the subscriber network element. The diallings are transmitted in digit frames as defined in the specifications of the NMT-450i system. The control unit 10 converts the digit frames it has received into voice-frequency diallings with an MFT converter 11 (Multi-Frequency Tone) known per se and feeds them further to the local exchange 7 of the PSTN network. The diallings can also be transmitted by a loop dialling if the local exchange 7 is unable to receive voice-frequency diallings. In this case a circuit arrangement known per se is preferably used instead of the MFT converter 11 for simulating a loop dialling.

The subscriber network unit 6 preferably comprises a memory device 12 in which diallings received from the subscriber unit can be temporarily buffered before they are transmitted to the local exchange 7. This may be necessary if the setting up of a telecommunication connection with the local exchange is for some reason delayed so much that the subscriber network element is unable to transmit diallings to the local exchange at the same rate as it receives them from the subscriber unit. The subscriber network element cannot transmit to the local exchange the diallings it has received until the local exchange has switched on a ready-for-dialling tone for the subscriber network element.

The control unit 10 shown in FIG. 2 maintains a subscriber unit database 13 in which it stores data indicating the current state of each active subscriber unit. In this connection an active subscriber unit means, for example, a subscriber unit with an ongoing call, or a subscriber unit in which a call is being set up or to which a calling is being transmitted for setting up a call. Therefore, when a calling is transmitted from the subscriber unit 1, for example, to the subscriber network element for setting up a call, the control unit stores the data about the calling in the subscriber unit database 13. Data is also stored in the subscriber unit database 13 to indicate when an OFF-hook message related to an outgoing call from the subscriber unit is transmitted to the local exchange 7.

When a calling is transmitted from the local exchange 7 to the subscriber network element 6, the control unit 10 immediately checks in the subscriber unit database the state of the subscriber unit that the calling concerns. In case it is marked in the subscriber unit database 13 that an outgoing call is being set up at the subscriber unit in question, the control unit 10 notices that a collision situation occurs. In this case the control unit 10 at once interrupts the switching of the outgoing call from the subscriber unit. This means that for example, the OFF-hook message of the outgoing call is not transmitted at all to the local exchange (if the OFF-hook message of the outgoing call had already been transmitted all the way to the exchange, the exchange would not transmit a calling related to a terminating call to the subscriber network unit because it would notice that the PCM time slot reserved for said subscriber is reserved). Furthermore, the subscriber network element transmits a calling to the subscriber unit in question. This calling is repeated a predetermined number of times, or until the subscriber unit responses to it, whereafter the subscriber network element connects the terminating call to the subscriber unit via the radio path.

When the signal generator 15 of the subscriber unit 1 notices that the transceiver unit 14 has received a release frame, it immediately checks the state of the user interface 2. If the state of the user interface 2 is OFF-hook, that is, the handset of the telephone used as. a user interface, for example, is picked up, the signal generator 15 at once starts generating and feeding a busy audio signal to the user interface. The busy audio signal is preferably the same as the busy audio signal used in the public switched telephone network, that is, an interrupted signal at a frequency of 425+/−25 Hz in which the length of the tone sequences and the silent sequences between them is 300 Ms. Hearing said audio signal, the user of the subscriber unit notices that the call has failed and replaces the handset, whereby the user interface moves to the ON-hook state, and the signal generator 15 stops generating the busy tone.

When the user interface has moved to the ON-hook state, the transceiver unit 14 of the terminal equipment 3 notices a calling directed to the subscriber unit and responds to it in a normal manner, from which it follows that the call forwarded from the local exchange 7 is switched to the user interface 2, whereby the user interface, i.e. a telephone, gives an ordinary calling signal to its user.

It is to be understood that the above description and the figures related thereto are only meant to illustrate one preferred embodiment of the invention without restricting the invention itself thereto. Thus the method, the subscriber unit and the subscriber network element of the invention can also be used in such WLL systems that are based on some other cellular radio system than the NMT-450i system shown above by way of example. Therefore, the preferred embodiments of the method and the subscriber network element of the invention may vary within the scope of the appended claims.

We claim as our Invention:

1. A method for handling a collision of an outgoing call from a subscriber unit and a terminating call at a subscriber unit in a radio system providing a wireless local loop, the method comprising:

interrupting a switching of the outgoing call from the subscriber unit;

transmitting a release frame to the subscriber unit;

transmitting a busy tone from the subscriber unit to a subscriber in response to the release frame;

transmitting a calling to the subscriber unit; and switching the terminating call to the subscriber unit after the subscriber unit has responded to the calling.

2. A subscriber unit according to claim 1, wherein the predetermined voice-frequency signal is a busy tone.

3. An apparatus comprising:

a subscriber network element of a radio system providing a wireless local loop, the subscriber network element having a data transfer connection with a local exchange of a public switched telephone network, the subscriber network element comprising:

means for establishing, via base stations, a radio connection to subscriber units located in a coverage area of the radio system, and for transmitting telecommunication signals between the subscriber units and the local exchange, means for detecting a collision between an outgoing call from a given subscriber unit and a call terminating at the given subscriber unit, interruption means for interrupting a switching of the outgoing call and for sending a release frame to the subscriber unit when the collision is detected, and means responsive to the interruption means for sending a calling to the subscriber unit after transmitting the release frame.

4. An apparatus according to claim 3, wherein the subscriber network element further comprises memory means for storing data indicating a state of each active subscriber unit, whereby the collision detection means determines whether the collision occurred based on the data contained in the memory means.

5. An apparatus according to claim 3, wherein the subscriber network element is connected to the local exchange with an open multiplexer connection of CCITT Q.512 V2 type using the 2 Mbit/s PCM system.

6. An apparatus according to claim 4, wherein the subscriber network element is connected to the local exchange with an open multiplexer connection of CCITT Q.512 V2 type using the 2 Mbit/s PCM system.

7. A subscriber unit of a radio system providing a wireless local loop, the subscriber unit comprising:

a user interface; and
   a terminal equipment including:
      receiver means for receiving radio-frequency signals, and
      a signal generator, responsive to the receiver means and to the user interface, for generating and feeding a predetermined voice-frequency signal to the user interface when the receiver means receives a release frame during an OFF-hook state of the user interface.

8. A subscriber unit of a radio system providing a wireless local loop, the subscriber unit comprising:

a user interface; and
   a terminal equipment including:
      a receiver for receiving radio-frequency signals, and
      a signal generator, responsive to the receiver and to the user interface, for generating and feeding a predetermined voice-frequency signal to the user interface when the receiver receives a release frame during an OFF-hook state of the user interface.

9. A subscriber unit according to claim 8, wherein the voice-frequency signal is a busy tone.

10. An apparatus according to claim 3, wherein the subscriber network element further comprises a memory for storing data indicating a state of each active subscriber unit, whereby the collision detection means determines whether the collision occurred based on the data contained in the memory.

11. An apparatus according to claim 10, wherein the subscriber network element is connected to the local exchange with an open multiplexer connection of CCITT Q.512 V2 type using the 2 Mbit/s PCM system.

* * * * *